Figure 4:
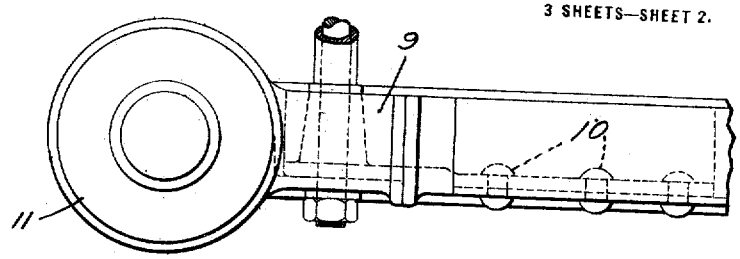

G. WESTINGHOUSE.
SPRING SUSPENSION.
APPLICATION FILED JUNE 28, 1911. RENEWED MAY 21, 1914.
1,185,357.
Patented May 30, 1916.
3 SHEETS—SHEET 1.
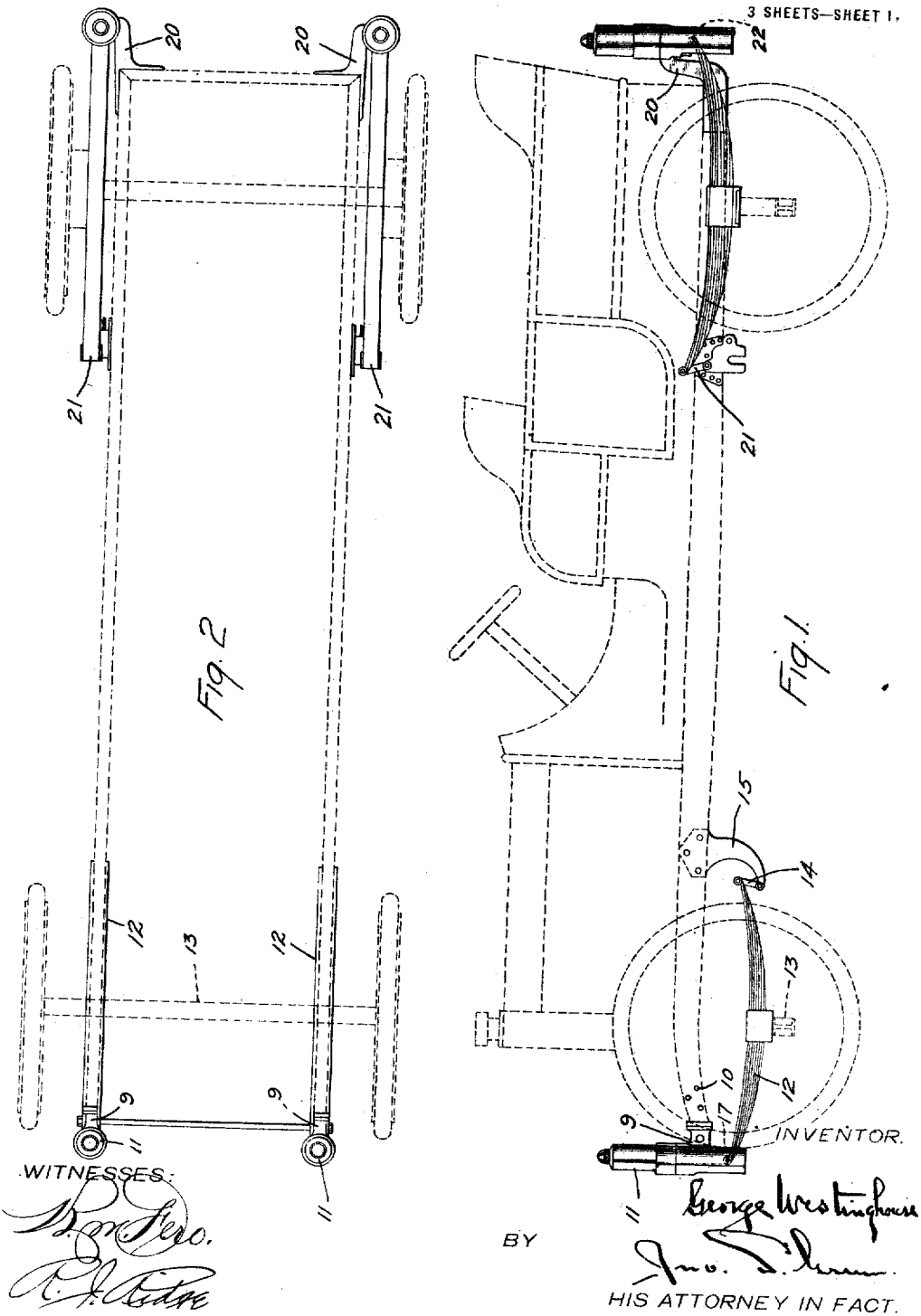

G. WESTINGHOUSE.
SPRING SUSPENSION.
APPLICATION FILED JUNE 28, 1911. RENEWED MAY 21, 1914.

1,185,357.

Patented May 30, 1916.
3 SHEETS—SHEET 2.

WITNESSES:

INVENTOR.
George Westinghouse
BY
HIS ATTORNEY IN FACT.

G. WESTINGHOUSE.
SPRING SUSPENSION.
APPLICATION FILED JUNE 28, 1911. RENEWED MAY 21, 1914.
1,185,357.
Patented May 30, 1916.
3 SHEETS—SHEET 3.
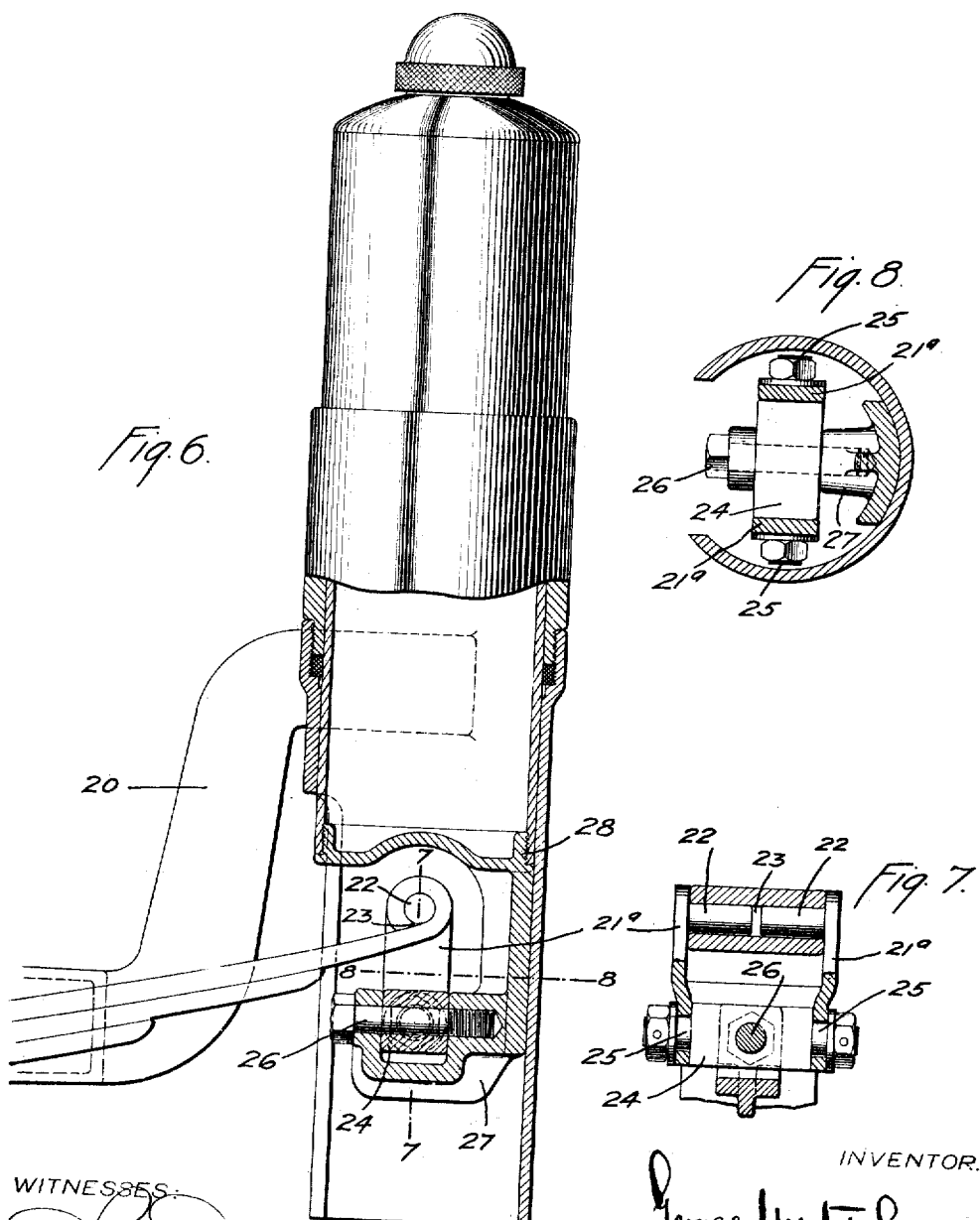
WITNESSES:
INVENTOR.
George Westinghouse
BY
HIS ATTORNEY IN FACT.

UNITED STATES PATENT OFFICE.

GEORGE WESTINGHOUSE OF PITTSBURGH, PENNSYLVANIA, ASSIGNOR TO THE WESTINGHOUSE AIR SPRING COMPANY, A CORPORATION OF PENNSYLVANIA.

SPRING SUSPENSION.

1,185,357.  Specification of Letters Patent.  Patented May 30, 1916.

Application filed June 28, 1911, Serial No. 635,806. Renewed May 21, 1914. Serial No. 840,137.

*To all whom it may concern:*

Be it known that I, GEORGE WESTINGHOUSE, a citizen of the United States, and a resident of Pittsburgh, in the county of Allegheny and State of Pennsylvania, have made a new and useful invention in Spring Suspension, of which the following is a specification.

This invention relates to vehicles and more particularly to the application of certain devices (set forth in, among other applications, one filed by me on September 29th, 1909, Serial No. 520,039; and devices similar to that illustrated in an application, Serial No. 545,957, filed by Richard Liebau, on February 25th, 1910) and improvements thereon to vehicles.

Vehicles to which this invention relates comprise a load platform, interposed means for affording elastic support for the same and additional means maintaining operative running position of the running gear with respect to the body of the vehicle and the direction of movement, while permitting all of the relative vertical movements necessary for practical elastic cushion support of the body of the vehicle.

The relative movements that are to be limited or prevented in such vehicles are fore-and-aft and lateral movements of the axle, and also fore-and-aft rocking thereof. The movements to be permitted are relative vertical movement of the axle both where such relative movement is equal for both ends of the axle, so that the latter maintains its normal parallelism with plane of the load platform of the vehicle, and also where such relative vertical movement is greater or different in direction at one end of the axle from the movement at the other end thereof, so as to produce an endwise tilt of the axle with respect to the vehicle body or frame.

It has been demonstrated that the several types of springs now common in vehicles such as automobiles, permit all of the desirable movements and prevent or sufficiently limit all of the undesirable movements.

In the illustrated embodiment of the invention I have shown it in connection with hydro-pneumatic springs such as illustrated in the prior applications referred to, and have so connected them up to the ordinary type of automobile spring that the outer casings thereof are rigidly secured to the vehicle body or load platform, and the inner movable member thereof I have shackled or pivotally connected to one end of the vehicle spring in the ordinary way, the other end of which is shackled or pivotally connected to the load platform or vehicle body.

For the sake of illustration, but with no idea of limiting this invention, I have also shown it as applied to an automobile equipped with semi-elliptic springs of the ordinary construction.

Figure 3:
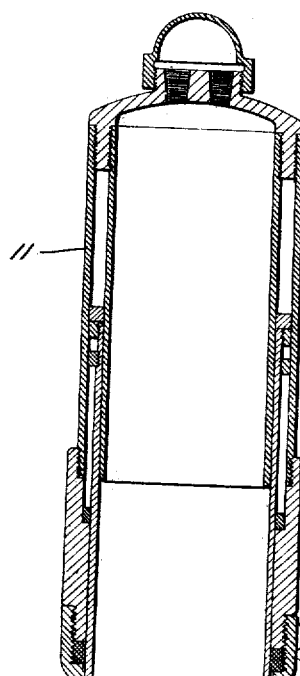
Figure 5:
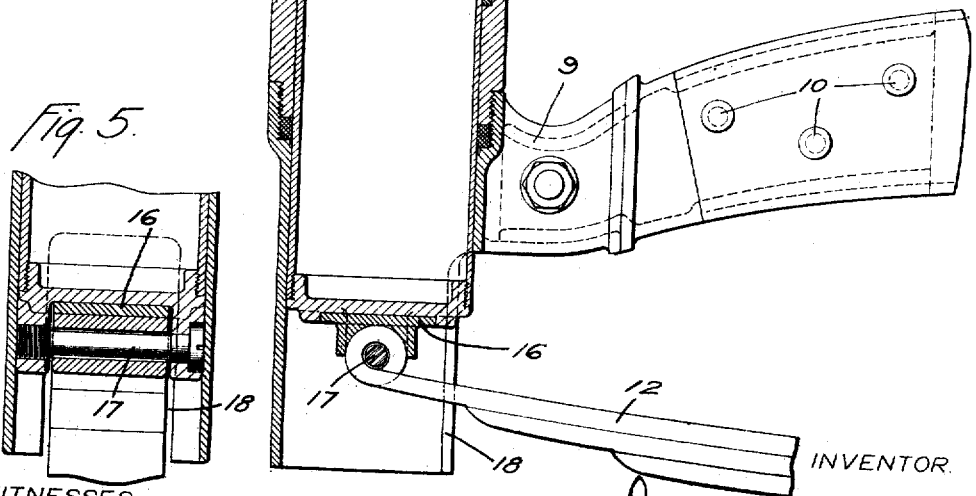

In the drawings Figure 1 is a side elevation of an automobile, the body thereof being shown by dotted lines, with this invention applied thereto. Fig. 2 is a top plan view of the same. Fig. 3 is a detailed view in sectional elevation of the forward end of the vehicle frame and front spring showing this invention applied thereto. Fig. 4 is a top plan view of the same; and Fig. 5 is a detail of the shackle or pivotal connection by means of which the movable member of the hydro-pneumatic spring is coupled to the vehicle spring. Fig. 6 is a detailed view partially in elevation and partially in section of the rear of the vehicle frame and rear spring, and shows a hydropneumatic spring secured thereto. Fig. 7 is a detailed view taken on line 7—7 in Fig. 6 of the shackle or pivotal connection for securing the movable member of the hydropneumatic spring to the vehicle steel spring. Fig. 8 is a cross sectional view of said shackle taken on line 8—8 of Fig. 6.

Since the pneumatic spring may vary widely in construction and forms the subject of other applications for patent, it need not be described here, but in all forms applicable for use with this invention, it is now believed there will be a part which is stationary with respect to the load platform or vehicle body and a part which moves with relation thereto. The part which is stationary with respect to the vehicle body, while stationary, may have movements with relation to said body, that is, it may be pivotally connected to said body but will not reciprocate or move vertically of the body while it may be allowed to swing or pivot with relation thereto. In the form of pneumatic spring utilized for illustration herein, there is an outer stationary part and an inner movable part telescopically arranged with relation to the stationary part.

In Fig. 1 a bracket 9 has an arm which extends into the channel frame of the vehicle body and is riveted thereto at 10. This carries the outer stationary part 11 of a pneumatic spring. The inner or movable part thereof is pivotally connected to the forward end of the steel spring 12, which is secured to the axle of the vehicle 13 and shackled at its rear end, as at 14, to a bracket 15 connected to the vehicle frame. The pivotal connection or shackle for securing a movable member of the pneumatic spring to the forward end of the front steel spring may be of various designs, but the one illustrated consists of a block 16 which rests on the eye of the steel spring 12, and is secured to the spring by means of a bolt 17 which passes through the eye of the spring with sufficient clearance, so that strains due to the twisting of the steel spring are not transmitted to the movable member of the pneumatic spring. The outer stationary part of the pneumatic spring is slotted as at 18, and within this slot the steel spring plays. The shackle 14 is arranged so that at all times it tends to force the steel spring toward the forward end of the stationary depending part of the pneumatic spring, that is, instead of dragging the forward axle by means of the frame, as is generally done, the forward axle is pushed by means of shackle 14. This relieves the pneumatic spring from the strains which it would receive if it were dragging the front axle.

To each corner of the rear of the vehicle frame an upwardly extending bracket 20 is secured, and to this the outer stationary part of the rear pneumatic spring is fastened. The rear end of the rear steel spring (the forward end thereof being shackled to the body at 21 in the customary manner) is connected to the movable member of the pneumatic spring by means of a shackle which will permit the spring to extend and contract, and the body and the rear axle to assume different positions relative one to the other without throwing the strains due thereto on to the movable member of the pneumatic spring. This shackle or pivotal connection consists of two depending links 21ª, each of which is provided with a pin 22, which fits within the spring eye 23 of the rear spring. A block 24 provided with trunnions 25, which are mounted within links 21ª, has a pin or bolt 26 passing through it, which bolt is carried in a bracket 27 secured to the movable member of the pneumatic spring at 28. This forms in effect a universal shackle and prevents twisting strains of the steel spring from being transmitted to the movable member. The outer depending portions of the rear pneumatic springs are slotted for the reception of the ends of rear steel springs, which steel springs play up and down within said slots as relative movements between the vehicle body and the rear axle take place.

From this disclosure it will be seen that this invention may be readily applied to all types of vehicles, to vehicles equipped with all of the different types of leaf springs which are now in use, these leaf springs serving as the tying members and acting as spring levers for connecting the movable members of the hydro-pneumatic springs to the axles and running gear of the vehicles.

In accordance with the provisions of the patent statutes I have described the principle of operation of my invention, together with the device which I now consider to represent the best embodiment thereof, but I desire to have it understood that the device shown is only illustrative and that the invention can be carried out in other ways.

Having thus described my invention what I claim is:

1. In combination with a load platform and running gear of a vehicle, a metallic leaf spring secured to said running gear and at one end pivotally connected or shackled to the load platform, a telescopically-arranged pneumatic spring located between the other end of said metallic spring and said load platform, and a guide member for said telescopically-arranged spring extending downwardly therefrom and slotted to receive the steel spring and to allow same to move longitudinally thereof.

2. In combination with a load platform and running gear of a vehicle, a metallic leaf spring secured to said running gear and at one end thereof connected to said load platform, a telescopically arranged pneumatic spring secured to said load platform, a shackle connecting said pneumatic spring and said metallic spring, and a guide member depending from said pneumatic spring and slotted to receive said steel spring and to surround said shackle.

3. In combination with a load platform and the running gear of a vehicle, a metallic spring secured to said running gear and at one end pivotally to said load platform, a telescopically arranged pneumatic spring located between the other end of said metallic spring and the load platform, and a guide member for said telescopically arranged spring rigidly secured to said load platform and slotted to receive the steel spring and to allow the same to move relatively thereto.

4. In combination with a load platform and the running gear of a vehicle, a leaf spring secured to said running gear and at one end of said load platform, a telescopically arranged pneumatic spring located between the other end of said leaf spring and said platform, and a guide member for said pneumatic spring rigidly mounted on said platform and extending downwardly therefrom and slotted to receive the leaf spring.

5. In combination with the load platform and the running gear of a vehicle, a metallic spring secured at an intermediate point to the running gear, at one end pivotally connected to the load platform, and at the other end connected to the moving member of a pneumatic spring, a pneumatic spring comprising a stationary member mounted on the load platform, and a movable member telescopically arranged with the stationary member and located above the adjacent end of the metallic spring, and a depending shackle pivotally connected to said metallic spring and to a portion of the movable member located below the end of the metallic spring.

6. In combination with the load platform and the running gear of a vehicle, a pneumatic spring comprising a member secured to the load platform, and a movable member telescopically arranged therewith, a leaf spring secured to the running gear with one end projecting below said movable member, and a depending shackle pivotally connected at its upper end to the projecting end of the spring, and a pin mounted on the movable member below the projecting end of the metallic spring to which the lower end of said shackle is pivotally connected.

7. In combination with the load platform and the running gear of a vehicle, a telescopic spring comprising a stationary member mounted on the load platform and a movable member telescopically arranged within the stationary member and having a shackle-mounting part located near the lower end thereof, a leaf spring secured to the running gear and to the load platform with one end projecting above the shackle-mounting part of the movable member, and a shackle pivotally connected at its upper end to the projecting end of the leaf spring and pivotally connected at its lower end to the shackle-mounting part of said movable member.

8. In combination with the load platform and the running gear of a vehicle, a leaf spring secured to the running gear and to the load platform with one end projecting and adapted to be secured to a pneumatic spring, a pneumatic spring located above the projecting end of said leaf spring and comprising a stationary member mounted on the load platform and slotted at one end to receive the projecting end of the leaf spring, and a movable member telescopically arranged with said stationary member, and a shackle having its upper end connected to the leaf spring and its lower end connected to said movable member and surrounded by the slotted portion of said stationary member.

9. In combination with the load platform and the running gear of a vehicle, a metallic spring secured to the running gear and to the load platform, with one end projecting and adapted to be connected to a pneumatic spring, and a pneumatic spring comprising a stationary member mounted on the load platform and slotted to receive the projecting end of the metallic spring, and a movable member telescopically arranged with the stationary member and secured to the projecting end of the metallic spring.

10. In combination with the load platform and the running gear of a vehicle, a metallic spring secured to the running gear and to the load platform and having a projecting end adapted to be secured to a telescopic spring, and a telescopic spring having one member mounted on the load platform and slotted to receive the projecting end of the metallic spring, and a movable member guided by the stationary member and loosely connected to the projecting end of the metallic spring whereby strains due to the twisting of the metallic spring are not transmitted to the movable member.

11. In combination with the frame and running gear of a vehicle, a leaf spring secured to the running gear and at one end linked or shackled to the frame and having the other end adapted to be secured to a telescopic spring, a telescopic spring comprising a stationary member rigidly secured to the frame and slotted to receive the leaf spring, and a movable member telescopically arranged with reference to the stationary member, and a bolt or pin for connecting the metallic spring to said movable member.

12. In combination with the load platform and the running gear of a vehicle, a flat spring connected to the running gear at an intermediate part of the spring, a telescopic spring comprising a stationary member mounted on the load platform and slotted at one end to receive a projecting end of the flat spring, and a movable member guided in its movements by the stationary member and connected to the projecting end of the flat spring, and a shackle for suspending the load platform from the other end of the flat spring, pivotally connected to the load platform and the flat spring and so arranged that it normally occupies an inclined position with the point of its connection with the load platform located closer to the point of connection of the flat spring with the running gear than the point of connection between it and the flat spring.

13. In combination with the frame of a vehicle, a leaf spring at its rear end shackled or linked to said frame, a supplemental telescopic spring having an outer guard cylinder rigidly secured to said frame and slotted to receive the leaf spring, and a cylinder telescoping within said guard cylinder and having a bolt connection with the leaf spring.

14. In combination with the frame of a vehicle, a front leaf spring at its rear end shackled or linked to said frame, a supplemental vertically telescoping spring having an outer member rigidly secured to said frame, an inner cylindrical member telescoping within said outer member, and a pin or bolt connecting the forward end of said leaf spring to said inner member.

15. In combination with the frame of a vehicle, a vehicle front axle, a leaf spring connected to said axle, a shackle or link connecting the rear of said leaf spring with said frame, a telescopic air spring having an outer or guard member rigidly secured to said frame, and at its rear slotted to receive the forward end of said leaf spring, a cylindrical member telescoping within said guard member, and a pin or bolt connecting the forward end of said leaf spring and said inner telescoping member.

16. In combination with the frame of a vehicle, a front axle, a leaf spring connected to said axle, a shackle or link connecting the rear of said leaf spring with said frame, a telescopic air spring having an outer or guard member rigidly secured to said frame and at its rear slotted to receive the forward end of said leaf spring, a cylindrical member telescoping within said guard member and a pin or bolt connecting the forward end of said leaf spring with said inner telescoping member; said link or shackle being positioned so that the inner telescoping member is forced against the forward inner surface of the guard member opposite said slotted portion.

In testimony whereof, I have hereunto subscribed my name this 26th day of June, 1911.

GEO. WESTINGHOUSE.

Witnesses:
  C. W. McGhee,
  R. J. Ridge.

telescopic spring having an outer guard cylinder rigidly secured to said frame and slotted to receive the leaf spring, and a cylinder telescoping within said guard cylinder and having a bolt connection with the leaf spring.

14. In combination with the frame of a vehicle, a front leaf spring at its rear end shackled or linked to said frame, a supplemental vertically telescoping spring having an outer member rigidly secured to said frame, an inner cylindrical member telescoping within said outer member, and a pin or bolt connecting the forward end of said leaf spring to said inner member.

15. In combination with the frame of a vehicle, a vehicle front axle, a leaf spring connected to said axle, a shackle or link connecting the rear of said leaf spring with said frame, a telescopic air spring having an outer or guard member rigidly secured to said frame, and at its rear slotted to receive the forward end of said leaf spring, a cylindrical member telescoping within said guard member, and a pin or bolt connecting the forward end of said leaf spring and said inner telescoping member.

16. In combination with the frame of a vehicle, a front axle, a leaf spring connected to said axle, a shackle or link connecting the rear of said leaf spring with said frame, a telescopic air spring having an outer or guard member rigidly secured to said frame and at its rear slotted to receive the forward end of said leaf spring, a cylindrical member telescoping within said guard member and a pin or bolt connecting the forward end of said leaf spring with said inner telescoping member; said link or shackle being positioned so that the inner telescoping member is forced against the forward inner surface of the guard member opposite said slotted portion.

In testimony whereof, I have hereunto subscribed my name this 26th day of June, 1911.

GEO. WESTINGHOUSE.

Witnesses:
C. W. McGhee,
R. J. Ridge.

---

Corrections in Letters Patent No. 1,185,357.

It is hereby certified that in Letters Patent No. 1,185,357, granted May 30, 1916, upon the application of George Westinghouse, of Pittsburgh, Pennsylvania, for an improvement in "Spring Suspension," errors appears in the printed specification requiring correction as follows: Page 2, line 129, claim 4, for the word "of" read *to;* page 4, line 27, claim 15, for the word "and" read *with;* and that the said Letters Patent should be read with these corrections therein that the same may conform to the record of the case in the Patent Office.

Signed and sealed this 27th day of June, A. D., 1916.

[SEAL.]

R. F. WHITEHEAD,
*Acting Commissioner of Patents.*

It is hereby certified that in Letters Patent No. 1,185,357, granted May 30, 1916, upon the application of George Westinghouse, of Pittsburgh, Pennsylvania, for an improvement in "Spring Suspension," errors appears in the printed specification requiring correction as follows: Page 2, line 129, claim 4, for the word "of" read *to;* page 4, line 27, claim 15, for the word "and" read *with;* and that the said Letters Patent should be read with these corrections therein that the same may conform to the record of the case in the Patent Office.

Signed and sealed this 27th day of June, A. D., 1916.

[SEAL.]

R. F. WHITEHEAD.

*Acting Commissioner of Patents.*